Patented Nov. 2, 1948

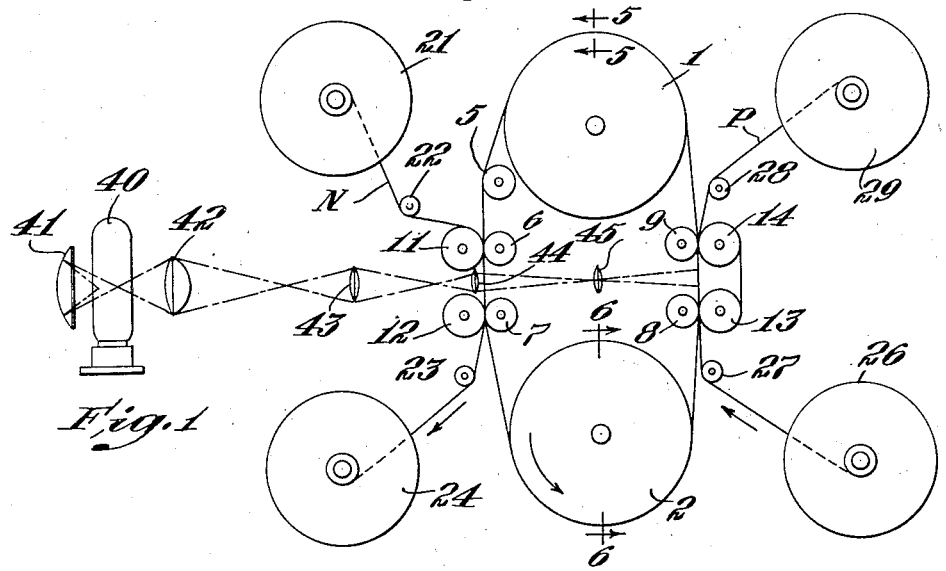
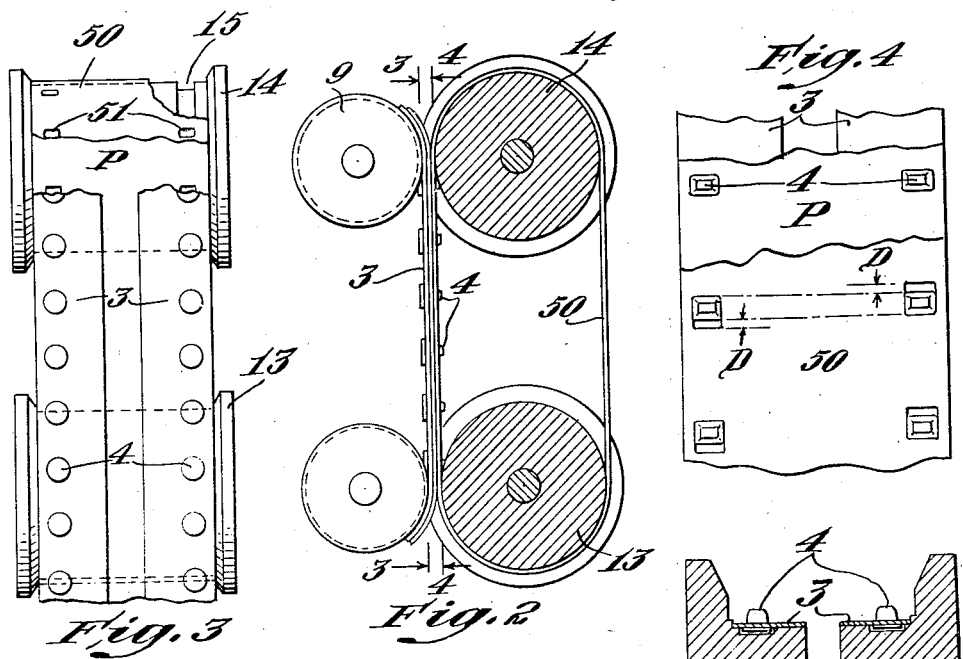
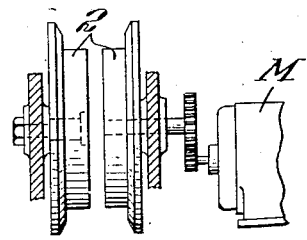

2,453,031

UNITED STATES PATENT OFFICE 2,453,031

CINEMATOGRAPHIC APPARATUS

Earl M. Olds, Jr., Van Nuys, Calif., assignor to Technicolor Motion Picture Corporation, Hollywood, Calif., a corporation of Maine Application August 2, 1946, Serial No. 687,888

14 Claims. (Cl. 271—2.3)

1

In the art of cinematography it is customary to conduct a plurality of films along a predetermined path while holding them in precise registry with each other by means of a belt or other carrier having teeth fitting in their sprocket holes; and sometimes it is necessary to have the central portion of the films uncovered by the carrier, as for example when light is to be projected to the films from the carrier side of the films. Heretofore this has been accomplished by using two narrow belts which support the films only along their margins and each of which has a row of sprocket teeth interlocking the films together along one margin, the two belts being trained over sheaves and driven by means of a motor connected to one of the sheaves. Owing to slippage on the sheaves the two belts tend to shift lengthwise relatively to each other, and inasmuch as the belts are interlocked with the opposite margins of the films this shift tendency puts a strain on the films which may cause distortion in printing or, in severe cases, physical damage to the films. It has been proposed to prevent lengthwise shift of one carrier relatively to the other by means of a synchronizing belt having sprocket holes meshing with the teeth of both carriers. However it has been found that this continuous meshing action wears the sprocket holes of the synchronizing belt and the teeth of the carriers.

Objects of the present invention are to avoid the aforesaid difficulties, to prevent lengthwise shift of one carrier relatively to the other, to avoid excessive wear on the teeth of the carrier and the sprocket holes of the synchronizing belt, and to produce smooth and steady operation.

The present invention involves apparatus for handling cinematographic film having a row of sprocket holes along each margin, the apparatus comprising two carriers movable independently of each other along parallel paths, each carrier having teeth engageable in the sprocket holes of one of the aforesaid rows, means for driving one carrier, and means for synchronizing the other carrier with the driven carrier, the synchronizing means having a row of sprocket holes for each of the aforesaid rows of teeth, the holes of the row for the driven carrier being enlarged in the direction opposite to the direction of film travel and the holes of the other row being enlarged in the direction of film travel whereby the teeth may enter and leave the holes of the synchronizing means without excessive wear and at the same time the second carrier is kept in synchronism with the driven carrier. Preferably the carriers comprise two endless belts movable independently of each other along adjacent paths in edgewise alignment and the synchronizing means comprises a third belt meshing with the teeth of both carrier belts. While the dimensions of the holes

2 of the synchronizing belt need not be the same in both rows of holes, preferably they are the same and the holes of one row are offset relatively to the holes of the other row lengthwise of the belt a distance equal to the difference between the dimensions of the holes and the dimensions of the teeth, so that each hole of one row trails the corresponding hole of the other row by the aforesaid distance, and the trailing holes receive the teeth of the driven carrier.

For the purpose of illustration a typical embodiment of the invention is shown in the accompanying drawings in which Fig. 1 is a diagrammatic view of a continuous projection printer;

Fig. 2 is an enlarged view of the right central portion of Fig. 1;

Fig. 3 is a section on line 3—3 of Fig. 2;

Fig. 4 is a section on line 4—4 of Fig. 2;

Fig. 5 is a section on line 5—5 of Fig. 1; and

Fig. 6 is a section on line 6—6 of Fig. 1.

The particular embodiment of the invention chosen for the purpose of illustration comprises two pairs of sheaves 1 and 2 over which are trained two belts 3 each having a marginal row of register teeth 4 adapted to fit in the sprocket holes of film. Each belt preferably comprises a thin ribbon of Monel metal with the register teeth mounted in the ribbon as disclosed in Patent 2,356,261. Intermediate the sheaves 1 and 2 the belts travel over rollers 5, 6, 7, 8 and 9. Opposite the rollers 6, 7, 8 and 9 are rollers 11, 12, 13 and 14 which are yieldingly pressed against the rollers 6, 7, 8 and 9 by any suitable means, as for example that disclosed in the copending application, Serial No. 626,266, filed November 2, 1945. The rollers 11, 12, 13 and 14 have circumferential slots to receive the projecting ends of pins 4 (Fig. 3).

The printing film N is fed from a supply reel 21 over roller 22, thence over roller 11 to the belts 3 where it is seated firmly over their register teeth by being compressed between the two rollers 6 and 11, thence across the optical path, thence between rollers 7 and 12, and thence over a roller 23 to a takeup reel 24. The film P to be printed is fed from a supply reel 26 over a roller 27, thence to roller 13 and the belts 3, thence across the optical axis, thence between the rollers 9 and 14, and thence over roller 28 to the take-up reel 29. As shown in Fig. 5 the sheaves 1 are not interconnected so that one may rotate relatively to the other, and as shown in Fig. 6 the sheaves 2 likewise are not interconnected so that one of them may be driven independently of the other as by means of a motor M.

The optical system comprises a lamp 40, a reflector 41, a condensing lens 42, a relay lens 43, an aperture lens 44 and a copying lens 45. Thus sound-tracks may be printed down the middle of the film P on opposite sides of the center line of the film. Ordinarily one track is printed from one film N and the other track is printed from another film N, the film P being reversed end to end between the two printing operations. By using 32 mm. film it may be split down the middle to form two 16 mm. films with a sound-track along one edge of each film and a row of sprocket holes along the other edge of each film.

The two toothed belts 3 are synchronized with each other by means of a belt 50 trained over the rollers 13 and 14, the belt having sprocket holes 51 (Fig. 3) to receive the projecting ends of the teeth 4. With the teeth of belts 3 meshing in the openings of belt 50, the two toothed belts 3 are geared together.

According to this invention the dimension of the holes in belt 50 lengthwise of its path of travel is greater than the corresponding dimension of the teeth 4 and the holes of one row are offset relatively to the holes of the other row lengthwise of the belt path a distance equal to the difference between the aforesaid dimension, so that each hole of one row trails the corresponding hole of the other row by the aforesaid distance and the trailing holes receive the teeth of the driven carrier. Thus in Fig. 4 the difference between the dimensions of the teeth and the sprocket holes is designated by D and left-hand carrier belt 3 is driven upwardly by its sheave 2 (Fig. 6). Inasmuch as the belt 50 is driven by the left-hand belt 3 the teeth 4 of the left-hand belt 3 engage the leading sides of the left-hand row of sprocket holes and inasmuch as the right-hand belt 3 is driven by the belt 50 the trailing sides of the teeth of the right-hand belt engage the trailing edges of the right-hand row of sprocket holes in belt 50. In this way the teeth of the two belts 3 are kept in exact alignment edgewise of the belt, and at the same time the sprocket holes are large enough to permit the teeth to enter and leave the holes without excessive wear.

It should be understood that the present disclosure is for the purpose of illustration only and that this invention includes all modifications and equivalents which fall within the scope of the appended claims.

I claim:

1. For handling cinematographic film having a row of sprocket holes along each margin, apparatus comprising two carriers movable independently of each other along parallel paths, each carrier having teeth engageable in the sprocket holes of one of said rows, means for driving one carrier, and means for synchronizing the other carrier with the driven carrier, the synchronizing means having a row of sprocket holes for each of said rows of teeth, the holes of the row for the driven carrier being enlarged in the direction opposite to the direction of film travel and the holes of the other row being enlarged in the direction of film travel.

2. For handling cinematographic film having a row of sprocket holes along each margin, apparatus comprising two carriers movable independently of each other along parallel paths, each carrier having teeth engageable in the sprocket holes of one of said rows, means for driving one carrier, and means for synchronizing the other carrier with the driven carrier, the synchronizing means comprising a belt traveling with the carriers, said belt having a row of sprocket holes for each of said rows of teeth, the holes of the row for the driven carrier being enlarged in the direction opposite to the direction of belt travel and the holes of the other row being enlarged in the direction of belt travel.

3. For handling cinematographic film having a row of sprocket holes along each margin, apparatus comprising two carrier belts movable independently of each other along adjacent paths in edgewise alignment, each belt having teeth engageable in the sprocket holes of one of said rows, means for driving one belt, and means for synchronizing the other belt with the driven belt, the synchronizing means having a row of sprocket holes for each of said rows of teeth, the holes of the row for the driven carrier being enlarged in the direction opposite to the direction of belt travel and the holes of the other row being enlarged in the direction of belt travel.

4. For handling cinematographic film having a row of sprocket holes along each margin, apparatus comprising two carrier belts movable independently of each other along adjacent paths in edgewise alignment, each belt having teeth engageable in the sprocket holes of one of said rows, means for driving one belt, and means for synchronizing the other belt with the driven belt, the synchronizing means comprising a third belt traveling with said carrier belts along a part of said paths, said third belt having a row of sprocket holes for each of said rows of teeth, the holes of the row for the driven carrier being enlarged in the direction opposite to the direction of belt travel and the holes of the other row being enlarged in the direction of belt travel.

5. For handling cinematographic film having a row of sprocket holes along each margin, apparatus comprising two carrier belts movable independently of each other along adjacent paths in edgewise alignment, each belt having teeth engageable in the sprocket holes of one of said rows, a set of sheaves for supporting each belt, means for driving one belt through one of its sheaves, and means for synchronizing the other belt with the driven belt, the synchronizing means having a row of sprocket holes for each of said rows of teeth, the holes of the row for the driven carrier being enlarged in the direction opposite to the direction of film travel and the holes of the other row being enlarged in the direction of film travel.

6. For handling cinematographic film having a row of sprocket holes along each margin, apparatus comprising two carrier belts movable independently of each other along adjacent paths in edgewise alignment, each belt having teeth engageable in the sprocket holes of one of said rows, a set of sheaves for supporting each belt, means for driving one belt through one of its sheaves, and means for synchronizing the other belt with the driven belt, the synchronizing means comprising a third belt traveling with said carrier belts along a part of said paths, said third belt having a row of sprocket holes for each of said rows of teeth, the holes of the row for the driven carrier being enlarged in the direction opposite to the direction of belt travel and the holes of the other row being enlarged in the direction of belt travel.

7. For handling cinematographic film having a row of sprocket holes along each margin with apparatus comprising two carriers movable independently of each other along parallel paths, each carrier having teeth engageable in the sprocket holes of one of said rows, and means for driving one carrier, a device for synchronizing the other carrier with the driven carrier, the device having a row of sprocket holes for each of said rows of teeth, the holes of the row for the driven carrier being enlarged in the direction opposite to the direction of film travel and the holes of the other row being enlarged in the direction of film travel.

8. For handling cinematographic film having a row of sprocket holes along each margin with apparatus comprising two carriers movable independently of each other along parallel paths, each carrier having teeth engageable in the sprocket holes of one of said rows, and means for driving one carrier, means for synchronizing the other carrier with the driven carrier, the synchronizing means comprising a belt traveling with the carriers, said belt having a row of sprocket holes for each of said rows of teeth, the holes of the row for the driven carrier being enlarged in the direction opposite to the direction of belt travel and the holes of the other row being enlarged in the direction of belt travel.

9. For handling cinematographic film having a row of sprocket holes along each margin, apparatus comprising two carriers movable independently of each other along parallel paths, each carrier having teeth engageable in the sprocket holes of one of said rows, means for driving one carrier, and means for synchronizing the other carrier with the driven carrier, the synchronizing means having a row of sprocket holes for each of said rows of teeth, the dimension of the holes lengthwise of said paths being greater than the corresponding dimension of the teeth and the holes of one row being offset relatively to the holes of the other row lengthwise of said paths a distance equal to the difference between said dimensions, so that each hole of one row trails the corresponding hole of the other row by said distance, and the trailing holes receiving the teeth of the driven carrier.

10. For handling cinematographic film having a row of sprocket holes along each margin, apparatus comprising two carriers movable independently of each other along parallel paths, each carrier having teeth engageable in the sprocket holes of one of said rows, means for driving one carrier, and means for synchronizing the other carrier with the driven carrier, the synchronizing means comprising a belt traveling with the carriers, said belt having a row of sprocket holes for each of said rows of teeth, the dimension of the holes lengthwise of said paths being greater than the corresponding dimension of the teeth and the holes of one row being offset relatively to the holes of the other row lengthwise of said paths a distance equal to the difference between said dimensions, so that each hole of one row trails the corresponding hole of the other row by said distance, and the trailing holes receiving the teeth of the driven carrier.

11. For handling cinematographic film having a row of sprocket holes along each margin, apparatus comprising two carrier belts movable independently of each other along adjacent paths in edgewise alignment, each belt having teeth engageable in the sprocket holes of one of said rows, means for driving one belt, and means for synchronizing the other belt with the driven belt, the synchronizing means having a row of sprocket holes for each of said rows of teeth, the dimension of the holes lengthwise of said paths being greater than the corresponding dimension of the teeth and the holes of one row being offset relatively to the holes of the other row lengthwise of said paths a distance equal to the difference between said dimensions, so that each hole of one row trails the corresponding hole of the other row by said distance, and the trailing holes receiving the teeth of the driven carrier.

12. For handling cinematographic film having a row of sprocket holes along each margin, apparatus comprising two carrier belts movable independently of each other along adjacent paths in edgewise alignment, each belt having teeth engageable in the sprocket holes of one of said rows, means for driving one belt, and means for synchronizing the other belt with the driven belt, the synchronizing means comprising a third belt traveling with said carrier belts along a part of said paths, said third belt having a row of sprocket holes for each of said rows of teeth, the dimension of the holes lengthwise of said paths being greater than the corresponding dimension of the teeth and the holes of one row being offset relatively to the holes of the other row lengthwise of said paths a distance equal to the difference between said dimensions, so that each hole of one row trails the corresponding hole of the other row by said distance, and the trailing holes receiving the teeth of the driven carrier.

13. For handling cinematographic film having a row of sprocket holes along each margin, apparatus comprising two carrier belts movable independently of each other along adjacent paths in edgewise alignment, each belt having teeth engageable in the sprocket holes of one of said rows, a set of sheaves for supporting each belt, means for driving one belt through one of its sheaves, and means for synchronizing the other belt with the driven belt, the synchronizing means having a row of sprocket holes for each of said rows of teeth, the dimension of the holes lengthwise of said paths being greater than the corresponding dimension of the teeth and the holes of one row being offset relatively to the holes of the other row lengthwise of said paths a distance equal to the difference between said dimensions, so that each hole of one row trails the corresponding hole of the other row by said distance, and the trailing holes receiving the teeth of the driven carrier.

14. For handling cinematographic film having a row of sprocket holes along each margin, apparatus comprising two carrier belts movable independently of each other along adjacent paths in edgewise alignment, each belt having teeth engageable in the sprocket holes of one of said rows, a set of sheaves for supporting each belt, means for driving one belt through one of its sheaves, and means for synchronizing the other belt with the driven belt, the synchronizing means comprising a third belt traveling with said carrier belts along a part of said paths, said third belt having a row of sprocket holes for each of said rows of teeth, the dimension of the holes lengthwise of said paths being greater than the corresponding dimension of the teeth and the holes of one row being offset relatively to the holes of the other row lengthwise of said paths a distance equal to the difference between said dimensions, so that each hole of one row trails the corresponding hole of the other row by said distance, and the trailing holes receiving the teeth of the driven carrier.

EARL M. OLDS, Jr.

No references cited.